(12) United States Patent
Huang et al.

(10) Patent No.: US 9,049,025 B1
(45) Date of Patent: Jun. 2, 2015

(54) METHOD OF DECRYPTING ENCRYPTED INFORMATION FOR UNSECURE PHONE

(75) Inventors: Ye Huang, San Ramon, CA (US); Jerry Kupsh, Concord, CA (US); Amir Mayblum, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 209 days.

(21) Appl. No.: 13/164,138

(22) Filed: Jun. 20, 2011

(51) Int. Cl.
*H04L 9/32* (2006.01)
*H04L 12/58* (2006.01)

(52) U.S. Cl.
CPC .. *H04L 9/32* (2013.01); *H04L 12/58* (2013.01)

(58) Field of Classification Search
CPC .......... H04K 1/00; H04K 9/00; H04L 9/3228; H04L 12/58; H04L 63/10; H04L 9/32
USPC .................. 380/270; 726/28, 3, 26; 709/206; 713/168
See application file for complete search history.

(56) References Cited

U.S. PATENT DOCUMENTS

| | | | |
|---|---|---|---|
| 6,304,969 B1 * | 10/2001 | Wasserman et al. .......... | 713/172 |
| 6,487,659 B1 * | 11/2002 | Kigo et al. .................... | 713/168 |
| 6,681,327 B1 * | 1/2004 | Jardin ........................... | 713/153 |
| 6,732,101 B1 * | 5/2004 | Cook ................................... | 1/1 |
| 6,910,136 B1 * | 6/2005 | Wasserman et al. .............. | 726/4 |
| 6,978,367 B1 * | 12/2005 | Hind et al. ..................... | 713/167 |
| 6,986,040 B1 * | 1/2006 | Kramer et al. ................ | 713/155 |
| 7,143,136 B1 * | 11/2006 | Drenan et al. ................ | 709/204 |
| 7,178,169 B1 * | 2/2007 | Salmonsen et al. ............. | 726/31 |
| 7,411,939 B1 * | 8/2008 | Lamb et al. ................... | 370/352 |
| 7,685,414 B1 * | 3/2010 | Appenzeller et al. ......... | 713/150 |
| RE42,171 E * | 2/2011 | Cha et al. ......................... | 726/26 |
| 8,010,783 B1 * | 8/2011 | Cahill ........................... | 713/155 |
| 8,145,718 B1 * | 3/2012 | Kacker et al. ................. | 709/206 |
| 8,230,010 B1 * | 7/2012 | Hardjono et al. ............. | 709/204 |
| 8,312,552 B1 * | 11/2012 | Hadden et al. .................. | 726/26 |
| 8,327,157 B2 * | 12/2012 | West ............................... | 713/189 |
| 8,433,896 B2 * | 4/2013 | Reddy ........................... | 713/155 |
| 8,521,821 B2 * | 8/2013 | van der Horst et al. ....... | 709/206 |
| 8,627,084 B1 * | 1/2014 | Pauker et al. ................. | 713/171 |
| 8,731,201 B2 * | 5/2014 | Green et al. .................. | 380/277 |
| 8,775,810 B1 * | 7/2014 | Snodgrass et al. ............ | 713/175 |
| 2002/0016910 A1 * | 2/2002 | Wright et al. ................. | 713/150 |
| 2004/0025057 A1 * | 2/2004 | Cook ............................ | 713/201 |
| 2004/0093397 A1 * | 5/2004 | Chiroglazov et al. ......... | 709/219 |
| 2004/0117644 A1 * | 6/2004 | Colvin .......................... | 713/193 |
| 2004/0117663 A1 * | 6/2004 | Colvin .......................... | 713/202 |

(Continued)

OTHER PUBLICATIONS

Elkins et al., "MIME Security with OpenPGP", RFC 3156, 2001.*

(Continued)

*Primary Examiner* — O. C. Vostal

(57) ABSTRACT

A server receives encrypted information for an intended recipient. The server determines, based on recipient information, whether the recipient's device is able to decrypt the encrypted information. If so, the encrypted information is provided to the device. Upon determining that the device is unable to decrypt the encrypted information, the server sends a notification message to the device. The notification message indicates that the encrypted message has been received. In response to the notification message, the server receives a response from the device. If the device is successfully authenticated, based on the response, the server decrypts the encrypted information and provides the decrypted information to the device for presentation to the recipient.

20 Claims, 3 Drawing Sheets

(56) References Cited

U.S. PATENT DOCUMENTS

| | | | |
|---|---|---|---|
| 2004/0179684 A1* | 9/2004 | Appenzeller et al. | 380/44 |
| 2005/0050317 A1* | 3/2005 | Kramer et al. | 713/155 |
| 2005/0071632 A1* | 3/2005 | Pauker et al. | 713/165 |
| 2005/0154923 A1* | 7/2005 | Lok et al. | 713/202 |
| 2005/0198165 A1* | 9/2005 | Reddel et al. | 709/206 |
| 2005/0220064 A1* | 10/2005 | Hundscheidt et al. | 370/342 |
| 2007/0050615 A1* | 3/2007 | Xu et al. | 713/151 |
| 2007/0101133 A1* | 5/2007 | Liu et al. | 713/168 |
| 2007/0125840 A1* | 6/2007 | Law et al. | 235/379 |
| 2007/0208942 A1* | 9/2007 | May | 713/171 |
| 2007/0294533 A1* | 12/2007 | Toh et al. | 713/170 |
| 2008/0085728 A1* | 4/2008 | Reding et al. | 455/466 |
| 2008/0098223 A1* | 4/2008 | Tan et al. | 713/170 |
| 2008/0130900 A1* | 6/2008 | Hsieh | 380/278 |
| 2008/0147481 A1* | 6/2008 | Robinson et al. | 705/10 |
| 2008/0209221 A1* | 8/2008 | Vennelakanti et al. | 713/183 |
| 2008/0256616 A1* | 10/2008 | Guarraci et al. | 726/9 |
| 2008/0292101 A1* | 11/2008 | Macchi | 380/270 |
| 2009/0136028 A1* | 5/2009 | Card, II | 380/200 |
| 2009/0138712 A1* | 5/2009 | Driscoll | 713/170 |
| 2009/0158397 A1* | 6/2009 | Herzog et al. | 726/4 |
| 2009/0192942 A1* | 7/2009 | Cottrille et al. | 705/59 |
| 2009/0208007 A1* | 8/2009 | Ohmori et al. | 380/201 |
| 2009/0210708 A1* | 8/2009 | Chou | 713/170 |
| 2009/0217036 A1* | 8/2009 | Irwin et al. | 713/168 |
| 2010/0017599 A1* | 1/2010 | Sellars et al. | 713/156 |
| 2010/0138658 A1* | 6/2010 | Logue et al. | 713/170 |
| 2010/0159962 A1* | 6/2010 | Cai et al. | 455/466 |
| 2010/0161984 A1* | 6/2010 | Pauker et al. | 713/168 |
| 2010/0316222 A1* | 12/2010 | Inami et al. | 380/277 |
| 2011/0016315 A1* | 1/2011 | Hamberg | 713/168 |
| 2011/0022838 A1* | 1/2011 | Shaikh | 713/156 |
| 2011/0047406 A1* | 2/2011 | Smith et al. | 714/4 |
| 2011/0145564 A1* | 6/2011 | Moshir et al. | 713/154 |
| 2011/0154462 A1* | 6/2011 | Charbonnier et al. | 726/7 |
| 2011/0164749 A1* | 7/2011 | Natarajan | 380/270 |
| 2011/0216357 A1* | 9/2011 | Kouno | 358/1.15 |
| 2011/0231923 A1* | 9/2011 | Bollay et al. | 726/9 |
| 2011/0276495 A1* | 11/2011 | Varadarajan et al. | 705/71 |
| 2011/0276638 A1* | 11/2011 | Errico et al. | 709/206 |
| 2011/0283110 A1* | 11/2011 | Dapkus et al. | 713/182 |
| 2011/0302646 A1* | 12/2011 | Ronda et al. | 726/9 |
| 2013/0124862 A1* | 5/2013 | Pestoni et al. | 713/168 |

OTHER PUBLICATIONS

Kristol et al., "HTTP State Management Mechanism", RFC 2965, 2000.*

Houvinen, "Modern Encryption Mehtods in User Authentication", 1997.*

* cited by examiner

US 9,049,025 B1

METHOD OF DECRYPTING ENCRYPTED INFORMATION FOR UNSECURE PHONE

TECHNICAL FIELD

The present disclosure relates to a method and a system for decrypting encrypted information for a device which does not have an ability to decrypt the encrypted information. More particularly, the present disclosure relates to a method or a system that decrypts the encrypted information on behalf of an unsecure mobile device and sends the decrypted information to the unsecure mobile device via a secure network communication.

BACKGROUND

As communication technologies have become more sophisticated, the number of smart cellular phones (such as iPhones, Blackberrys and Droids) in use has been increasing. Smart phones generally have many functions including data encryption and decryption functions. Although the use of smart phones is increasing, there are still a large number of more basic cellular phones and other mobile devices in use. These types of phones have limited functionality compared with the smart phones. One notable example of such limited functionality is the inability of these phones to locally decrypt received encrypted data. Thus, when, for example, an entity wishes to send a secure message (i.e., an encrypted message) to intended recipients (such as employees and/or customers) via email or a text message, the secure message is sent only to the devices that have the ability to locally decrypt received encrypted data, such as smart phones, (hereinafter referred to as "secure" mobile devices) as there may be no secure way to send the secure message to those intended recipients using devices that do not have the ability to decrypt the secure message.

Accordingly, there is a need for providing a method or a system that enables the users of such mobile devices that do not have the ability to decrypt the secure message (hereinafter referred to as "unsecure" mobile devices) without decryption ability to receive the decrypted information.

SUMMARY

The present disclosure provides a network based method and system to allow unsecure phone users or users of other devices that similarly lack decryption capability to receive information in a secured manner from entities that send encrypted information.

The present disclosure addresses one or more of the aforementioned problems, and provides a method or a system in which a secured message delivering service is available to the users of unsecure phone or the like in a user friendly manner.

In one example, a method of transmitting encrypted information includes the following steps performed by a server. The server receives the encrypted information encrypted by and sent from a sender to an intended recipient. The encrypted information may be accompanied with recipient information of the intended recipient. The server determines, based on the recipient information, whether or not a device of the intended recipient of the encrypted information is able to decrypt the encrypted information.

Upon determining that the device is able to decrypt the encrypted information, the server sends the encrypted information to the device. On the other hand, upon determining that the device is unable to decrypt the encrypted information, the server sends a notification message to the device, receives a response to the notification message from the device, responsive to the response, decrypts the encrypted information and provides the decrypted information to the device. The notification message indicates that the server received the encrypted information addressed to the intended recipient.

In the above methods, the device may be a mobile phone (cellular phone). In such a case, the recipient information may include, but is not limited to, a mobile directory number (MDN) of the mobile phone.

In any of the above methods, the server may further provide encryption key information to the sender for encryption, so that the server decrypts the encrypted information based on the encryption key information.

In any of the above methods, the notification message includes a reference identifier assigned to the encrypted information by the server and a network address which is accessible by the device for responding to the notification message and from which the device receives the decrypted information. The response from the device of the intended recipient may include the reference identifier.

In any of the above methods, access to the network address by the device is provided via a secure network connection (e.g., HTTPS).

In any of the above methods, the server finds the encrypted information based on the reference identifier included in the response, and decrypts the found encrypted information.

In any of the above methods, the response includes authentication information, and at least one of the decrypting and providing steps is responsive to the server determining from the authentication information that that the device is eligible to receive the decrypted information.

In any of the above methods, the notification message is sent, for example, as a short messaging service (SMS) message.

In any of the above methods, the server may further, in response to sending the notification message, receives an acknowledgment from the device, and in response to receiving the acknowledgment, sends a delivery acknowledgment to the sender.

In any of the above methods, the server may further receive non-encrypted information from the device, encrypt the non-encrypted information and send the encrypted non-encrypted information to a designated receiver.

In another example, an apparatus, for example a server system, is configured to realize the functions in the aforementioned methods. The apparatus includes a processor, a non-transitory storage device storing a program which is executed by the processor and an interface to a network. The program, when executed by the processor, causes the apparatus to perform any of the aforementioned methods. For example, the programs causes the apparatus to receive encrypted information encrypted by and sent from a sender to an intended recipient, the encrypted information being accompanied with recipient information; determine based on the recipient information whether or not a device of the intended recipient of the encrypted information is able to decrypt the encrypted information; upon determining that the device is able to decrypt the encrypted information: send the encrypted information to the device; and upon determining that the device is unable to decrypt the encrypted information, send a notification message to the device, the notification message indicating that the server received the encrypted message addressed to the recipient; receive a response to the notification message from the device; responsive to the response, decrypt the encrypted information; and provide the decrypted information to the device.

The method and the apparatus of the present disclosure, together with further objects and advantages, can be better understood by reference to the following detailed description and the accompanying drawings.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
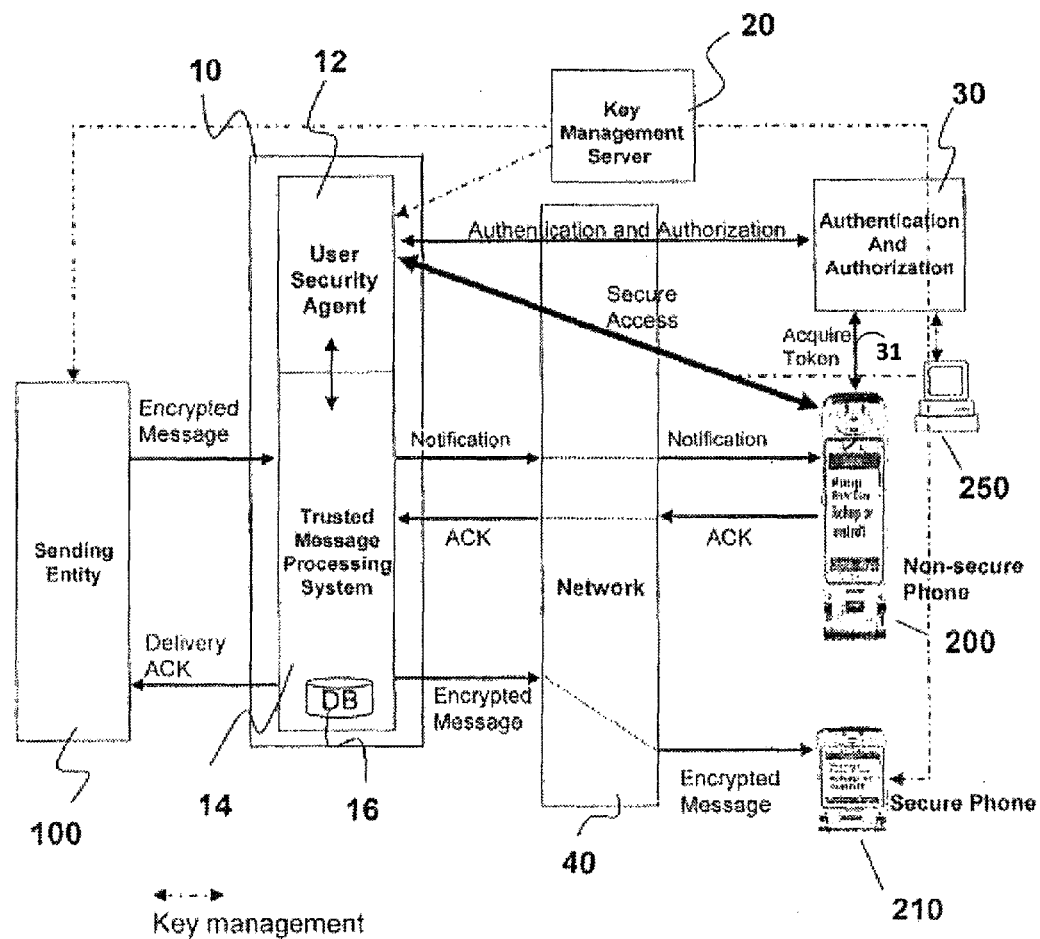
FIG. 1 shows an exemplary overall system offering secure communication services.
Figure 3:
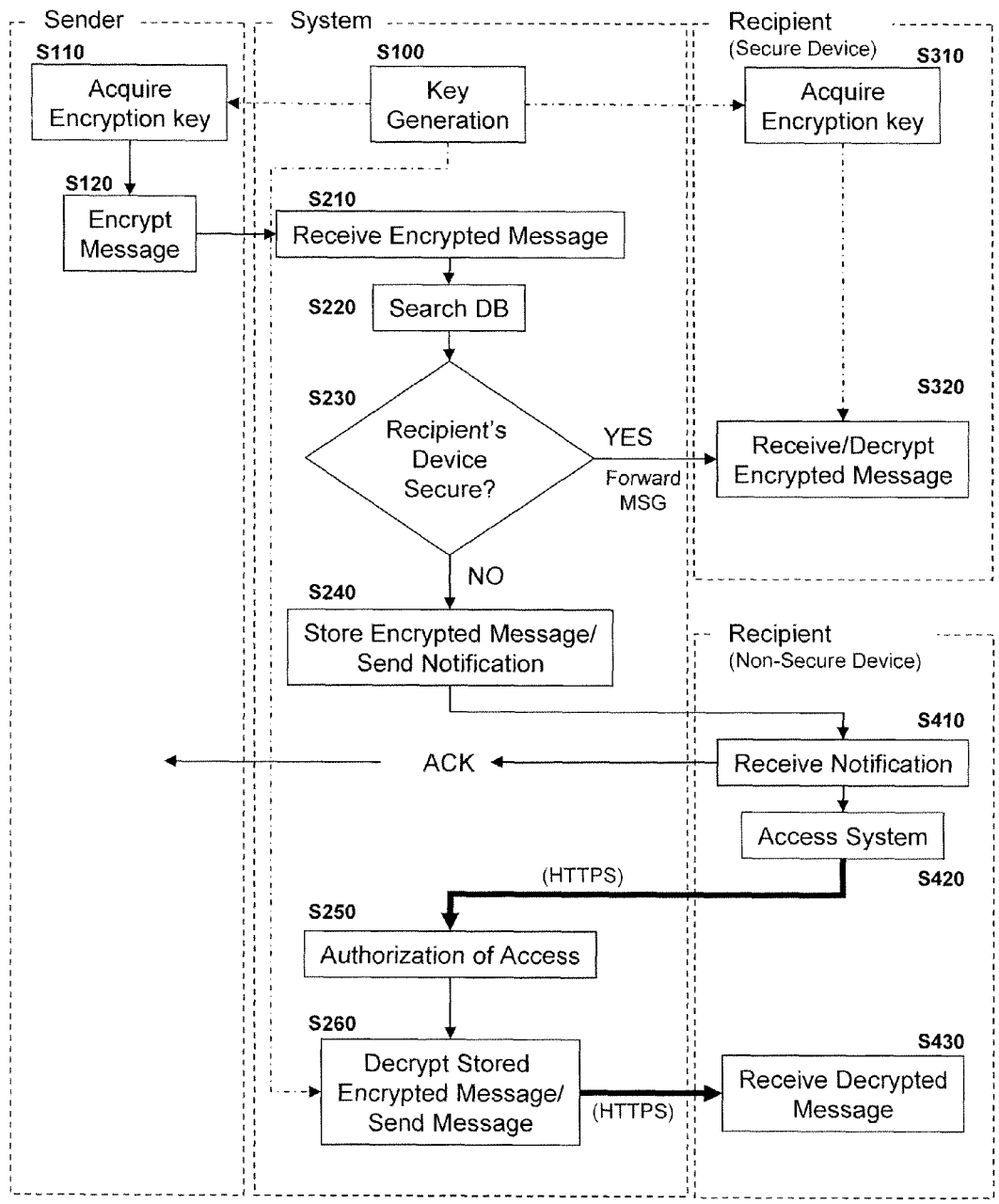
FIG. 3 shows an exemplary flow of the secure communication services.

FIG. 1 shows an exemplary overall system supporting secure message communications, and FIG. 3 shows an exemplary flow of the secure communication services. In this system, users who wish to utilize the secure message delivering service provided by this system register in this system, as subscribers. When registering in the system, the users provide their information. This information includes, but is not limited to, mobile directory numbers (MDNs), model numbers or serial numbers of the users' mobile phones, and/or email addresses.

The system for providing secure message communications includes a main server 10, a Key Management Server 20 and an Authentication and Authorization System 30. The main server 10 includes, inter alia, a Trusted Message Processing System 14 and a User Security Agent 12. The main server 10, the Key Management Server 20 and an Authentication and Authorization System 30 are coupled via a network, or may be integrated into a single server system. As shown, the Message Processing System 14 and the User Security Agent 12 can be a single server system. The main server 10 is configured to be connected to, for example, a wireless network and the internet.

The main server 10 maintains a subscriber database 16, in which user registration information is stored. This allows the main server 10 to determine the types of devices registered to different users. In particular, the subscriber database 16 stores user and device information sufficient to allow the main server 10 to determine the ability of each user (via his/her device) to encrypt data transmitted from/decrypt data transmitted to his/her device. For example, the subscriber database 16 stores for each mobile device the MDN, the model or serial number, and application programs installed.

Once the users have registered as subscribers, the users receive encryption key information (including an encryption key and possibly one or more decryption keys) from, for example, the Key Management Server 20 (S110). The encryption key information may be received by the subscriber at any point before decrypting a particular message, for example, immediately after registering, when network conditions reaches a predetermined threshold (e.g., traffic falls below a predetermined limit), immediately preceding (or succeeding) transmission of the message. The encryption keys are generated and distributed by the Key Management Server 20 to all of the subscribers (S100, S310) whose devices can encrypt/decrypt information (i.e., secure mobile devices). The encryption and/or decryption keys for one or more encryption techniques are stored in each secure mobile device. The key(s) may also be stored in a subscriber's computer if the subscriber desires to utilize the computer in addition to, or instead of, the mobile device. The keys are different from subscriber to subscriber.

It is possible for the user to limit recipients. In such a case, the user may designate recipients in the system. The Key Management Server 20 will distribute key information for decryption only to such designated recipients. Further, it may be possible for the user, the Key Management Server 20, or another network entity in communication with the Key Management Server 20 to set up one or more groups of users to which the secure messages are sent and/or from which secure messages are received via this system. In such a case, the encryption/decryption keys may be same within the members of a particular group and may be different from group to group. Key information may be transmitted to all of the subscribers or a subset of all of the subscribers (e.g., dependent on priority levels of the subscribers). If key information is provided to multiple groups, whether or not the combination of the groups includes all of the subscribers or merely a subset of all of the subscribers, the key information may be provided at different predetermined times to the different groups (e.g., to one group immediately, to another group immediately preceding transmission of the message).

For those mobile devices identified as unsecure, the Trusted Messaging Processing System 14 acts as a security agent in a manner similar to a security agent (e.g., a secure messaging client program) in a secure mobile device. The Trusted Messaging Processing System 14 receives and stores the keys on behalf of the unsecure mobile device. Key generation and distribution are performed at the time of the registration or at the time when the subscriber wishes to utilize the service (i.e., sending/receiving an encrypted message).

A sending entity 100 (one of the subscribers, or a device or an application server that communicates with subscribers) wishes to send an important, sensitive or confidential message to one or more recipients in a secured manner. Non-subscriber may receive the secure message through this system. The sending entity 100 encrypts the message using the encryption key acquired from the Key Management Server 20 and sends the encrypted message to the intended recipient(s) (S120). The encrypted message is sent to the Trusted Messaging Processing System 14 (S210). The networks for transporting the message from the sending entity 100 to the Trusted Messaging Processing System 14 are omitted for simplicity. The encrypted message will include or be associated with intended recipient information. The recipient information may include, for example, the MDN of the recipient's mobile device or an e-mail address. Any type of address or identifier may be included as long as it can be used to uniquely identify the recipient's mobile device.

In one example, the sending entity 100 is a subscriber who utilizes a smart phone to encrypt a message and to send the encrypted message. In other examples, the sending entity 100 (subscriber) may utilize a computer to encrypt the message and to send the encrypted message. Applicable message types include, but are not limited to, a text message (such as an SMS message), an image (such as a JPG image file), or data (such as a spreadsheet).

When the Trusted Messaging Processing System 14 receives the encrypted message, the Trusted Messaging Processing System 14 extracts or otherwise obtains the recipient information and subsequently analyzes the recipient information so obtained (S220). Based on the recipient information and the corresponding data stored in the subscriber database 16, the Trusted Messaging Processing System 14 determines whether or not a mobile phone or other device of the recipient to which the encrypted message is directed has an ability to decrypt the encrypted information (S230).

In the example shown in FIG. 1, two recipient devices of different types (a mobile smart/secure phone and non-smart/unsecure phone) are shown as recipient devices. The subscriber database 16, in such a case, includes a record corresponding to the recipient's mobile phone (either a secure or unsecure phone) and can be accessed based on the recipient information. The record indicates the types/class of device, for example, secure phone 210 or unsecure phone 200 in one example. If multiple encryption techniques are supported, the record may also indicate which encryption technique(s) the secure phone 210 is capable of decrypting. If multiple devices are registered to the same subscriber in the subscriber database 16, the subscriber database 16 may contain an indication of which of these mobile devices to send the message. This indication may be provided by the subscriber when registering each mobile device after the first. The subscriber may provide this indication either automatically as a part of registration of any mobile device or being separately prompted to replace the primary device after attempting to register the new device and the subscriber database 16 determines that another mobile device is registered to the subscriber. The subscriber may also indicate that the message is to be supplied to all or only some of the registered devices.

If the Trusted Messaging Processing System 14 determines that the recipient mobile phone has the ability to decrypt the encrypted message, e.g., the secure mobile phone 210 includes a secure messaging client program, the encrypted message is simply forwarded to the recipient's secure mobile phone 210, through a network 40. The encrypted message is received by the secure mobile phone 210 and decrypted locally by the secure messaging client program installed on the recipient's secure mobile phone 210 by using the encryption key stored in the recipient's secure mobile phone 210 (S320).

If the Trusted Messaging Processing System 14 determines that the recipient mobile phone does not have the ability to decrypt the encrypted message, the Trusted Messaging Processing System 14 provides a reference identifier (ID) for the encrypted message and has the User Security Agent 12 within the main server 10 store the encrypted message sent from the sending entity 100 together with the reference ID (S240).

Then, the Trusted Messaging Processing System 14 sends a notification message to the recipient's unsecure mobile phone 200 (which, as above, does not have the ability to decrypt the encrypted message). The notification includes, but is not limited to, the reference ID of the encrypted message and a network address (e.g., URL) of the User Security Agent 12. The notification message is sent to the recipient's unsecure mobile phone 200 over the existing mobile network, for example, as a short messaging service (SMS) message. The notification message may contain a flag indicating that the encrypted message is received so that the user of the unsecure mobile phone 200 can treat the notification message differently from other normal SMS messages.

When the notification message has been successfully delivered to the unsecure mobile phone 200 (S410), the unsecure mobile phone 200 returns an acknowledgment (ACK) to the Trusted Messaging Processing System 14. The Trusted Messaging Processing System 14 sends a delivery acknowledgment (delivery ACK) to the sending entity 100 so that the sender knows that the notification has been received by the recipient.

Upon receiving the notification message, the unsecure mobile phone 200 accesses the URL of the User Security Agent 12 designated in the notification message (S420). The connection to the URL of the User Security Agent 12 is established by a secured connection, for example, HTTPS (i.e., Hypertext Transfer Protocol over Secure Socket Layer) or Secure HTTP (Secure HyperText Transfer Protocol).

In order to prevent unauthorized access to the encrypted message, the User Security Agent 12 requires an authentication process to authenticate access by the unsecure mobile phone 200 (S250). A number of authentication techniques may be employed. These techniques may include logging into a secure website (e.g., that directly accesses the User Security Agent 12) through a user name and a password.

A token may be utilized for authentication. In one example, the unsecure mobile phone 200 acquires a token from the Authentication and Authorization System 30 in advance, via direct communication between the mobile phone 200 and the Authentication and Authorization System 30, as shown by the arrow 31. When the unsecure mobile phone 200 accesses the User Security Agent 12, the token is provided to the User Security Agent 12. The User Security Agent 12 authenticates the access from the unsecure mobile phone 200 by using the provided token. In another example, two tokens may be utilized. The first token is acquired from an Authentication and Authorization System 30 in advance and resides on (i.e., is stored in) the unsecure mobile phone 200. The first token is effective longer, for example, a day or a week, and can be utilized multiple times. The second token is acquired based on the first token from the Authentication and Authorization System 30 at the time of the access to the User Security Agent 12. The second token is effective for a short period, for example, 60 seconds, and can be utilized once for authentication.

When a token is acquired by the unsecure mobile phone 200, the unsecure mobile phone 200 sends a response message to the User Security Agent 12 for validation. The response message includes the token together with the reference ID included in the notification message and any other necessary information. The token sent from the unsecure mobile phone 200 along with MDN is forwarded to the Authentication and Authorization System 30. Then, the Authentication and Authorization System 30 authenticates the access if the received token is valid for the MDN by computing the token via the corresponding key for the MDN.

In other examples, instead of (or in addition to) using a secure access method such as HTTPS for authentication, the user may text a fixed code representing the User Security Agent 12 with the token generated with the key that is acquired from the Authentication and authorization System 30.

Once the User Security Agent 12 confirms the authentication of the user access from the unsecure mobile phone 200, the User Security Agent 12 decrypts the requested encrypted message (S260). The User Security Agent 12 finds the requested encrypted message using the reference ID contained in the response message. After the decryption, the User Security Agent 12 sends the decrypted message to the unsecure mobile phone 200, and the unsecure mobile phone 200 receives the decrypted message (S430). In one example, the decrypted message may be sent to the unsecure mobile phone 200 via the HTTPS connection. If the recipient's information indicates that the user of the unsecure mobile phone 200 prefers the message in plain text, the decrypted message may be send as a plain text via the HTTPS connection. This improves the experience for users who prefer a simple text message to messages containing, e.g., images. Formats of the message sent to the recipients may be modified to any format (html, pdf format) if the recipient information so specifies.

After receiving the decrypted message, the user of the unsecure mobile phone 200 may store the encrypted and/or decrypted message in the User Security Agent 12 or delete the encrypted and/or decrypted message from the User Security Agent 12. The User Security Agent 12 may prompt the user to delete the message or the user may initiate the deletion of the message without being prompted. When the user is disconnected from the session with the User Security Agent 12, the decrypted message is removed from the display and local memory of the unsecure mobile phone 200. Afterword, the user is prompted to repeat the same process to again securely acquire the message.

The User Security Agent 12 further includes functionality of the user of the unsecure mobile phone 200 to reply to the message transmitted from the sending entity 100. In such a case, the unsecure mobile phone 200 sends an unencrypted reply message to the User Security Agent 12 via the HTTPS connection. The User Security Agent 12 encrypts the reply message, on behalf of the unsecure mobile phone, if the user (recipient) of the unsecure mobile phone 200 desires. The reply message (whether encrypted or not) is then sent to the sending entity 100. The user of the unsecure mobile phone 200 is also able to create a new message, have the Security Agent 12 encrypt the new message, and send the encrypted message to desired recipients, in a similar manner to merely replying to the message or the sending entity 100 sending the original message.

The aforementioned decryption system may also be used by mobile devices that are able to encrypt/decrypt using some techniques but not others (e.g., a smart phone may have one or more decryption algorithms but not include the decryption program for a particular message). If the recipient information in the subscriber database 16 indicates that the recipient does not have the ability to decrypt the message, the subscriber database 16 determines that the decryption service of the Security Agent 12 is to be used. The procedure to access the message is similar to the above. The aforementioned decryption service may be available to all or only a subset of wireless service carriers.

Although the above examples illustrate the decrypted message being accessed using the unsecure mobile device, other devices may be used in different embodiments. For example, the decrypted message may be retrieved using a PC 250. In this case, the PC 250 performs steps similar to the aforementioned steps implemented by the unsecure mobile device 200. This may be preferable when multimedia data or a large volume of data is to be received, a fact that may also be indicated through the notification message.

Figure 2:
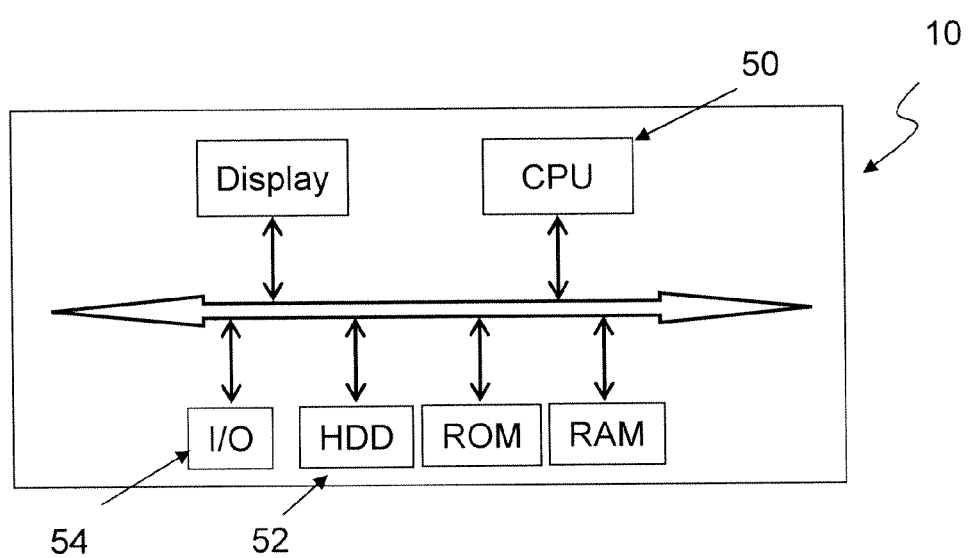
FIG. 2 shows an exemplary server configuration, which may be used as any of the servers in the system of FIG. 1.

FIG. 2 shows an exemplary server configuration, which may be used as any of the servers or systems in the system of FIG. 1. The main server 10, the Key Management Server 20 and/or the Authentication and Authorization System 30 include a processor 50, a non-transitory storage device 52 storing a program which is executed by the processor 50 and an interface 54 to a network. Examples of the storage device 52 include, but are not limited to, HDDs, optical disks, semiconductor devices or magnetic media. For example, when the program is executed by the processor 50 in the main server 10, the executed program causes the main server 10 to perform the aforementioned functions of the main server 10 including those of the Trusted Message Processing System 14 and the User Security Agent 12. In other embodiments, the main server 10 may include the key management server 20 and the Authentication and Authorization System 30 therein. The main server 10 may be a single computer system or a combination of computers.

Although mobile phones are described in some detail in the embodiments above, other mobile devices that have connectivity to a local or wide area network and thus are able either directly or indirectly (e.g., through an accessory) to interact with the various servers and other network devices may be used. The recipient's device, for example, may be a laptop computer, a tablet PC or an electronic book reader.

(A) Hospital and Medical Service Providers:

(1) A doctor wishes to send a message to his/her peer doctor(s) during a session with a patient, e.g., to ask for opinions. The message contains the patient's private information. Some of the peer doctors may have unsecure phones. The sending doctor encrypts at least some of the information (e.g., that pertinent to the opinion) and questions, and sends the encrypted message to the Trusted Message Processing System 14 so that the peer doctors can receive the information in a secure manner. The message may be retrieved via a secure phone, an unsecure phone or other user device.

(2) A hospital emergency desk operator needs to send a dispatch to a team of medical staff personnel to respond to an emergency, including the patient information and other sensitive medical information. The operator encrypts at least some of the information and sends the encrypted message to the medical staff personnel via the Trusted Message Processing System 14. The message may be retrieved via a secure phone, an unsecure phone or other user device.

(B) Banks and Financial Institutions

A mobile banking application from a bank includes an account balance notification message to each of its customers. Each of such a message includes sensitive customer information and their personal financial information. Some of the customers prefer receiving such information on a mobile phone, but not all of them utilize smart phones. The bank encrypts at least some of the sensitive/personal information and sends the encrypted message to its customers via the Trusted Message Processing System 14. The message may be retrieved via a secure phone, an unsecure phone or other user device.

One of the advantages of the present method and system is that even traditional unsecured phones can be used to receive decrypted messages for and send encrypted messages by their users. This provides more flexibility to the sending entities in sending secure messages.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    receiving, by a server, registration information of a plurality of devices, including information indicating whether each device is a secure device having encryption and decryption capabilities or a non-secure device not having encryption and decryption capabilities;
    distributing, by a key management server, to the server and to the secure devices, respective encryption and decryption keys;
    receiving, in the server, information encrypted by and sent from one of the secure devices to an intended recipient device through a communication network, the encrypted information being accompanied with information identifying the intended recipient and the encrypted information being encrypted using the respective secure device encryption key that is different from the encryption keys used by other secure devices;
    determining in the server, based on the recipient information and the registration information, whether a device of the intended recipient is a secure or a non-secure device; and
    upon determining that the intended recipient device is a non-secure device:
        storing the encrypted information with a reference identifier identifying the encrypted information;
        sending a notification message to the intended recipient device, the notification message including: (a) a flag indicating that the server received the encrypted information addressed to the intended recipient device and, (b) the reference identifier;
        receiving a response to the notification message from the intended recipient device, the response including the reference identifier and a token acquired by the intended recipient device from an authentication and authorization system connected to the communication network via direct communication between the intended recipient device and the authentication and authorization systems, wherein the authentication and authorization system is different from the server;
        after receiving the response, authenticating the intended recipient device by the server, based on the token received in the response to the notification message by communicating with the authentication and authorization system through the communication network;
        decrypting the encrypted information identified by the reference identifier included in the response using the decryption key of the secure device wherein the decryption key of the secure device is different from the token;
        establishing, by the server, a secured network connection between the server and the intended recipient device; and
        sending the decrypted information, to the intended recipient device, via the established secured network connection;
    wherein at least one of the decrypting and sending steps is responsive to the server determining, based on the communication with the authentication and authorization system, that the token is valid.

2. The method of claim 1, wherein the intended recipient device is a mobile phone.

3. The method of claim 2, wherein the recipient information includes a mobile directory number of the mobile phone.

4. The method of claim 1, wherein:
    the notification message includes:
        a network address which is sent to the intended recipient device for responding to the notification message and from which the intended recipient device receives the decrypted information.

5. The method of claim 4, wherein to the sending of the network address to the intended recipient device is via the established secured network connection.

6. The method of claim 4, wherein the server finds the encrypted information based on the reference identifier included in the response, and decrypts the found encrypted information.

7. The method of claim 4, wherein the notification message is sent as a short messaging service (SMS) message.

8. The method of claim 1, further comprising the server:
in response to sending the notification message, receiving an acknowledgment from the intended recipient device; and
in response to receiving the acknowledgment, sending a delivery acknowledgment to the respective secure device subscriber.

9. The method of claim 1, further comprising, the server:
receiving non-encrypted information from the intended recipient device;
encrypting the non-encrypted information; and
sending the encrypted information to a designated receiver device.

10. The method of claim 1, wherein the token is valid for a limited period of time after the token is acquired by the intended recipient device from the authentication and authorization system via the direct communication and for a single authentication.

11. The method of claim 1, wherein the token:
is valid for a limited period of time after the token is acquired by the intended recipient device from the authentication and authorization system via the direct communication, and
includes:
a first token that is valid for a first limited period of time and is valid for multiple authentications, and
a second token that is valid for a second limited period of time shorter than the first limited period of time and is valid only for a single authentication.

12. A system comprising:
an authentication and authorization system;
a key management server;
a server, configured to be in communication with the authentication and authorization system and the key management server; wherein:
the key management server is configured to distribute, to the server and to respective subscribers of the secure devices, respective encryption and decryption keys; and
the server is configured to:
receive registration information for a plurality of subscriber devices, including information indicating whether each device is a secure device having encryption and decryption capabilities or a non-secure device not having encryption and decryption capabilities;
receive information encrypted by and sent from one of the secure devices to an intended recipient through a communication network, the encrypted information being accompanied with information identifying the intended recipient and the encrypted information being encrypted using the respective secure device encryption key that is different from the encryption keys used by other secure devices;
determine, based on the recipient information and the registration information, whether a device of the intended recipient of the encrypted information is a secure or a non-secure device; and
upon determining that the intended recipient device is a non-secure device:
store the encrypted information with a reference identifier identifying the encrypted information;
send a notification message to the intended recipient device that includes: (a) a flag which indicates that the server received the encrypted message addressed to the intended recipient device and the reference identifier;
receive a response to the notification message from the intended recipient device, the response including the reference identifier and a token acquired by the intended recipient device from the authentication and authorization system connected to the communication network via direct communication between the intended recipient device and the authentication and authorization system, wherein the authentication and authorization system is different from the server;
after reception of the response, the server is configured to:
authenticate the intended recipient device based on the token received in the response to the notification message by communicating with the authentication and authorization system through the communication network;
decrypt the encrypted information identified by the reference identifier included in the response using the decryption key of the secure device and wherein the decryption key of the secure device is different from the token;
establish a secured network connection between the server and the intended recipient device; and
send the decrypted information, to the intended recipient device, via the established secured network connection;
wherein at least one of the decryption and sending is responsive to the determination performed by the server, based on the communication with the authentication and authorization system, that the token is valid.

13. The system of claim 12, wherein the intended recipient device is a mobile phone.

14. The system of claim 13, wherein the recipient information includes a mobile directory number of the mobile phone.

15. The system of claim 12, wherein:
the notification message includes a network address sent by the server for responding to the notification message and from which the intended recipient device receives the decrypted information.

16. The system of claim 15, wherein the sending the network address is provided via the secure network connection.

17. The system of claim 15, wherein the server finds the encrypted information based on the reference identifier included in the response, and decrypts the found encrypted information.

18. The system of claim 15, wherein the server sends the notification message as a short messaging service (SMS) message.

19. The system of claim 12, wherein the server is further configured to:
receive an acknowledgment from the intended recipient device, in response to sending the notification message; and
in response to receiving the acknowledgment, send a delivery acknowledgment to the respective secure device subscriber.

20. The system of claim 12, wherein the server is further configured to:
receive non-encrypted information from the intended recipient device;
encrypt the non-encrypted information; and
send the encrypted information to a designated receiver device.

* * * * *